United States Patent [19]

Tanaka et al.

[11] Patent Number: 5,070,325
[45] Date of Patent: Dec. 3, 1991

[54] COORDINATE INPUT APPARATUS

[75] Inventors: Atsushi Tanaka, Kawasaki; Kiyoshi Kaneko, Yokohama; Yuichiro Yoshimura, Yokohama; Noriyuki Suzuki, Tokyo; Katsuyuki Kobayashi, Tokyo; Shigeki Mori, Tokyo; Shinnosuke Taniishi, Kawasaki, all of Japan

[73] Assignee: Canon Kabushiki Kaisha, Tokyo, Japan

[21] Appl. No.: 324,109

[22] Filed: Mar. 16, 1989

[30] Foreign Application Priority Data

Mar. 18, 1988 [JP] Japan ................................ 63-63180
Mar. 18, 1988 [JP] Japan ................................ 63-63181

[51] Int. Cl.$^5$ ........................ G06K 11/06; G06F 3/033
[52] U.S. Cl. ................................ 340/706; 340/712; 179/18; 179/19
[58] Field of Search ................ 340/706, 711, 712; 178/19, 18

[56] References Cited
FOREIGN PATENT DOCUMENTS

0207527 1/1987 European Pat. Off. ............ 340/706

Primary Examiner—Alvin E. Oberley
Attorney, Agent, or Firm—Fitzpatrick, Cella, Harper & Scinto

[57] ABSTRACT

A coordinate input apparatus includes a vibration pen, a vibration transmission plate, a plurality of vibration detecting units, a calculating unit, a memory unit, and a control unit. The calculating unit calculates vibration transmission times from a point designated by the vibration pen to the vibration detecting units, and calculates coordinate values of the designated point of the vibration pen. The memory unit stores the vibration transmission times from a first designated point of the vibration pen on the vibration transmission plate to the vibration detecting units and coordinate values of the first designated point. The control unit performs calculations on the basis of vibration transmission times from a second designated point calculated by the calculating unit to the vibration detecting units, the vibration transmission times from the first designated point and the coordinate values of the first designated point stored in the memory unit, thereby calculating coordinate values of the second designated point.

17 Claims, 5 Drawing Sheets

FIG.8

COORDINATE INPUT APPARATUS

BACKGROUND OF THE INVENTION

1. Field of the Invention

The present invention relates to a coordinate input apparatus and, more particularly, to a coordinate input apparatus in which a vibration input from a vibration pen is detected by a plurality of vibration sensors arranged on a vibration transmission plate, thereby detecting coordinates of the vibration pen on the vibration transmission plate.

2. Related Background Art

The above coordinate detecting system has advantages that an arrangement of the vibration transmission plate constituting an input tablet is simple and the vibration transmission plate can be placed on a display unit or an original because a transparent member can be utilized as the vibration transmission plate.

Figure 8:
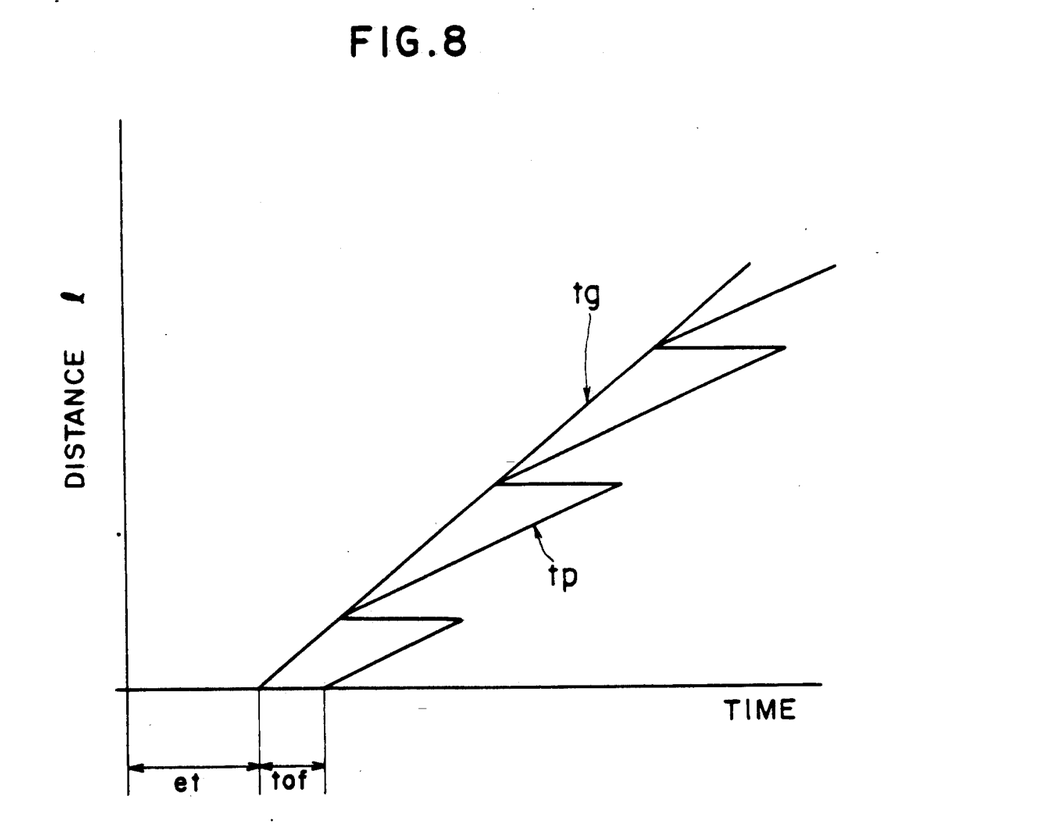
FIG. 8 a graph for explaining problems of a conventional coordinate input apparatus.

In a coordinate input apparatus of this type, an input vibration from the vibration pen is detected by a plurality of vibration sensors arranged on the vibration transmission plate Correct coordinates cannot be detected, however, unless influences of a phase delay and a circuit delay time of a detector upon vibration transmission on the vibration transmission plate are corrected. The circuit delay includes not only a delay of an electrical circuit but also that of a circuit between the vibration pen and the vibration transmission plate through which a vibration is mechanically transmitted FIG. 8 is a graph in which the abscissa represents a time t and the ordinate represents a vibration transmission distance from an input point to a vibration sensor. FIG. 8 shows changes in group delay time tg required for an envelope of a vibration waveform to propagate for a certain distance and in a phase delay time tp required for the phase of the waveform to propagate for the distance As shown in FIG. 8, a circuit delay time et is included even when the distance is 0, thereby offsetting a curve (straight line) representing individual delay times to the right in the graph. A phase waveform generates regular phase delays in accordance with a wavelength as shown in FIG. 8. A difference tof between the group delay time tg and the phase delay time tp at distance 0, i.e., a phase offset changes in accordance with the circuit delay time.

In a system in which a transverse component on a vibration transmission plate is detected to measure a vibration transmission time, a method of determining the vibration transmission time by using both the group and phase delay times tg and tp is known In this method, however, a correct vibration transmission time cannot be obtained unless correction of the circuit delay time et and the phase offset tof is performed.

For this reason, in a known conventional method, a correction value corresponding to average circuit delay time et and average phase offset tof measured in advance is stored and subtracted from a measurement value to correct the vibration transmission time.

Upon determination of the circuit delay time et and the phase offset tof, however, a calculation must be performed for data sampled at a certain point by using constants such as a group speed, a phase speed and a period. Therefore, coordinate determination precision is sometimes degraded by a speed error or a calculation error.

In addition, an actual circuit delay time changes in accordance with an environmental variation such as a temperature change. Therefore, in the conventional system, a correct vibration transmission time cannot be measured when environmental conditions change.

SUMMARY OF THE INVENTION an object of the present invention to

It is provide a coordinate input apparatus capable of correcting a vibration transmission time measurement error or a calculation error, thereby performing correct coordinate input.

It is another object of the present invention to provide a coordinate input apparatus capable of correcting an input coordinate value variation caused by an environmental variation, thereby performing correct coordinate input.

DETAILED DESCRIPTION OF THE PREFERRED EMBODIMENTS

Preferred Embodiments of the present invention will be described in detail below with reference to the accompanying drawings.

Figure 1:
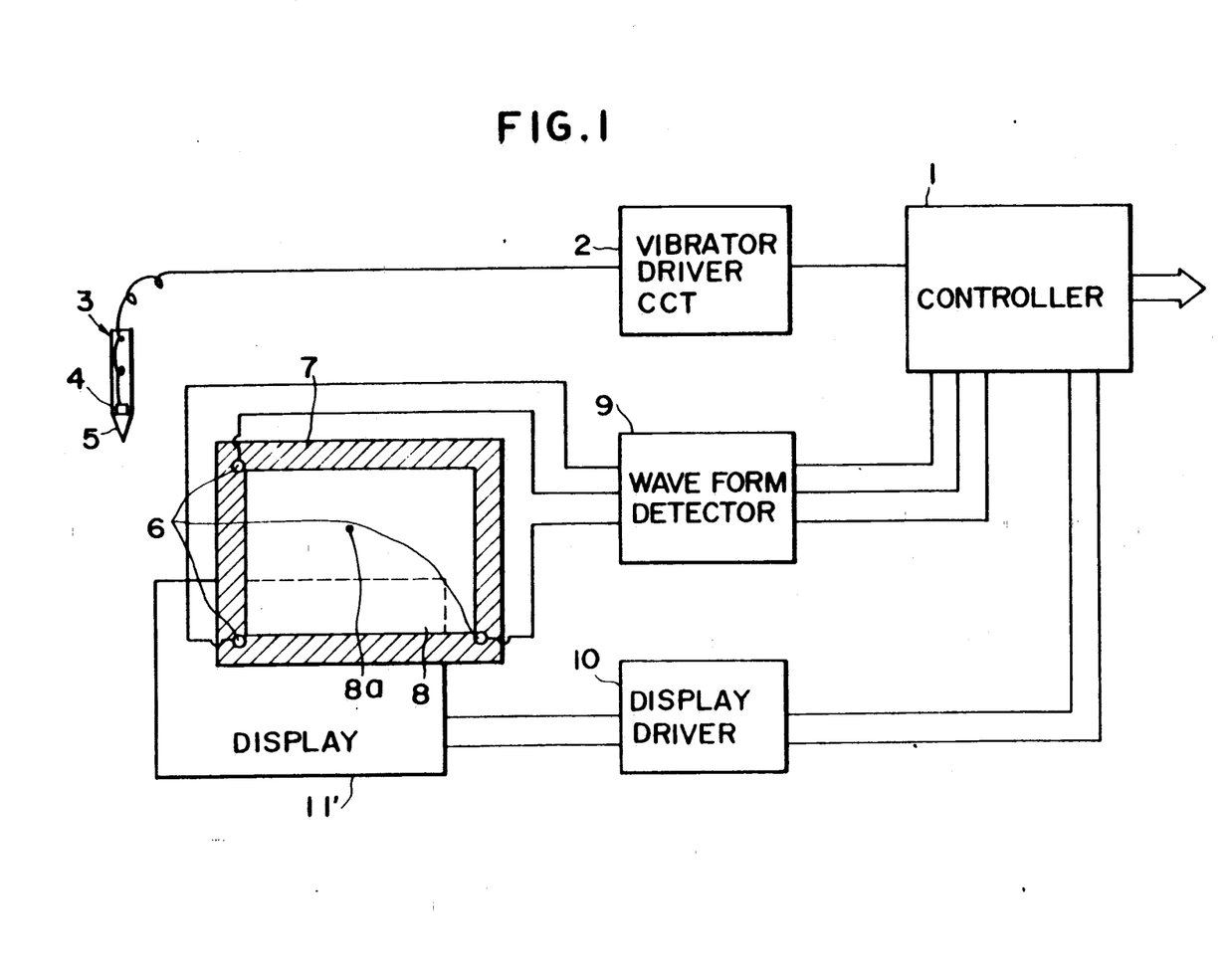
FIG. 1 is a block diagram showing an arrangement of an information input/output apparatus adopting the present invention.

FIG. 1 shows a structure of an information input/output apparatus adopting the present invention. In the information input/output apparatus shown in FIG. 1, coordinates are input by a vibration pen 3 to an input tablet constituted by a vibration transmission plate 8, and an input image is displayed on a display 11' comprising a CRT arranged under the input tablet in accordance with the input coordinate information.

Referring to FIG. 1, the vibration transmission plate 8 consisting of an acryl or glass plate transmits a vibration input from the vibration pen 3 to three vibration sensors 6 arranged on its corners. In this embodiment, by measuring a transmission time of an ultrasonic vibration transmitted from the vibration pen 3 to the vibration sensors 6 via the vibration transmission plate 8, coordinates of the vibration pen 3 on the vibration transmission plate 8 are detected.

In order to prevent a vibration transmitted from the vibration pen 3 from being reflected from a peripheral portion of the vibration transmission plate 8 to return toward its central portion, the peripheral portion is supported by a reflection preventing member 7 consisting of silicone rubber or the like.

The vibration transmission plate 8 is placed on the display 11' such as a CRT (or a liquid crystal display)

capable of performing dot display, so that a dot is displayed at a position touched by the vibration pen 3. That is, a dot is displayed at a position of the display 11' corresponding to the detected coordinates of the vibration pen 3. As a result, an image constituted by dots, lines and the like input by the vibration pen 3 appears after a locus of the vibration pen as if the image is written on paper.

In addition, with the above arrangement, a menu may be displayed on the display 11' so that a menu item can be selected by using the vibration pen, or a prompt may be displayed thereon so that the vibration pen 3 can be brought into contact with a predetermined position.

A mark 8a is provided at a predetermined position (the position is entirely arbitrary) on an input surface of the vibration transmission plate 8. In this embodiment, coordinates of the mark 8a are stored in a ROM or the like beforehand so that vibration input is performed by the vibration pen 3 at this point to measure a vibration transmission time to each vibration sensor 6. This measurement value is used to correct the vibration transmission time. A correction method will be described later.

The vibration pen 3 for inputting an ultrasonic vibration to the vibration transmission plate 8 has a vibrator 4 constituted by a piezoelectric element therein. An ultrasonic vibration generated by the vibrator 4 is transmitted to the vibration transmission plate 8 via a horn portion 5 having a sharp tip end.

Figure 2:
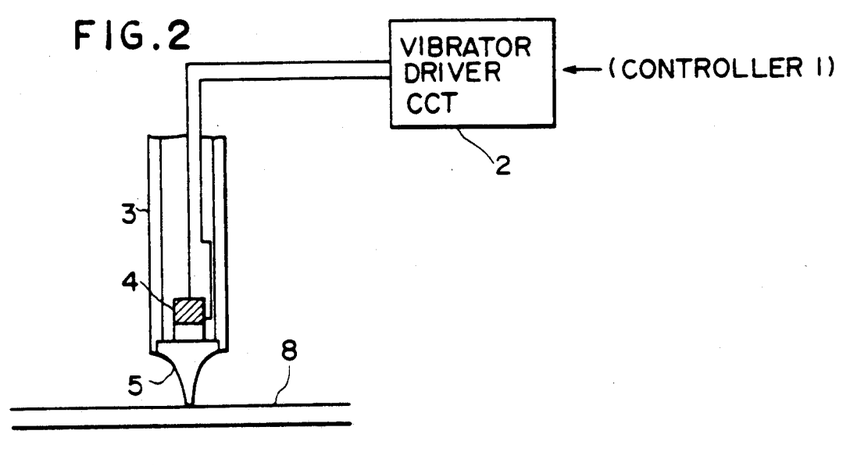
FIG. 2 is a sectional view showing a structure of a vibration pen.

FIG. 2 shows a structure of the vibration pen 3. The vibrator 4 incorporated in the vibration pen 3 is driven by a vibrator driver circuit 2. A drive signal for the vibrator 4 is supplied as a pulse signal of low level from a controller 1 shown in FIG. 1, amplified with a predetermined gain by the vibrator driver circuit 2 capable of low-impedance driving, and then applied to the vibrator 4.

The electrical drive signal is converted into a mechanical ultrasonic vibration by the vibrator 4 and transmitted to the vibration transmission plate 8 via the horn portion 5.

A vibration frequency of the vibrator 4 is set at a value capable of generating a plate wave on the vibration transmission plate 8 consisting of, e.g., acryl or glass. In addition, upon vibrator driving, a vibration mode is selected such that the vibrator 4 vibrates mainly in the vertical direction in FIG. 2 with respect to the vibration transmission plate 8. Also, by setting the vibration frequency of the vibrator 4 to be its resonance frequency, vibration conversion can be efficiency performed.

An elastic wave transmitted to the vibration transmission plate 8 as described above is a transverse plate wave having an advantage that it is hardly, adversely affected by a scratch or obstacle on the surface of the vibration transmission plate 8 as compared with a longitudinal wave such as a surface wave.

Referring back to FIG. 1, each vibration sensor 6 arranged at the corner portion of the vibration transmission plate 8 is also constituted by a mechano-electrical converting element such as a piezoelectric element. Output signals from the three vibration sensors 6 are supplied to a waveform detector 9, and vibration arrival timings to the sensors are detected by waveform detection processing to be described later. Detected timing signals are supplied to the controller 1.

The controller 1 detects vibration transmission times to the sensors in accordance with the detected timings supplied from the waveform detector, and detects a coordinate input position of the vibration pen 3 on the vibration transmission plate 8 on the basis of the vibration transmission times.

The detected coordinate information of the vibration pen 3 is processed by the controller 1 in accordance with an output system of the display 11'. That is, on the basis of the input coordinate information, the controller controls an output operation of the display 11' via a display driver 10.

Figure 3:
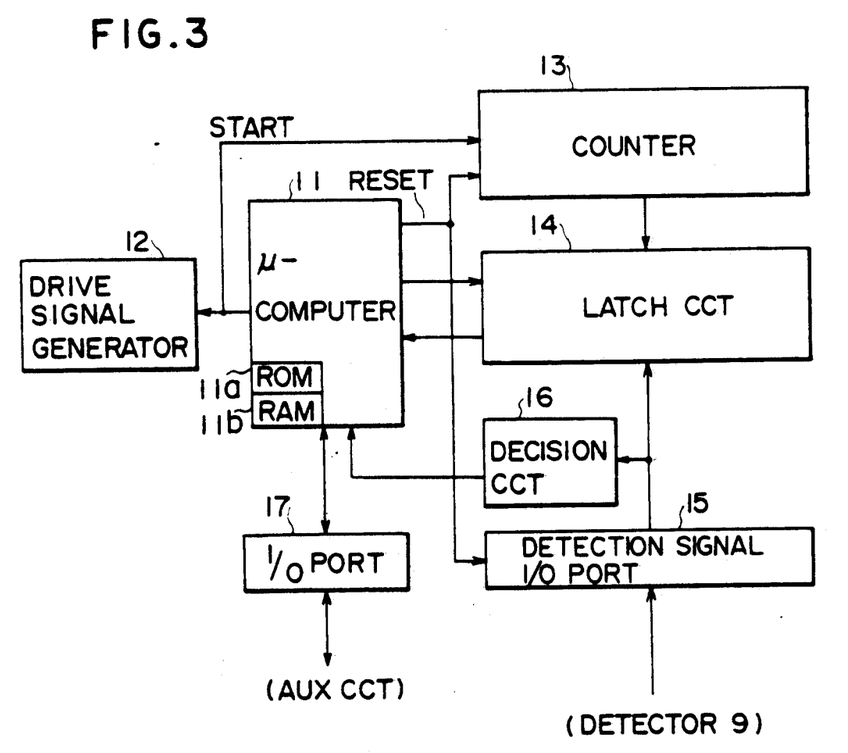
FIG. 3 is a block diagram showing a structure of a controller shown in FIG. 1.

FIG. 3 shows a structure of the controller 1 shown in FIG. 1. Referring to FIG. 3, structures of a drive system of the vibration pen 3 and a vibration detection system of the vibration sensor 6 are mainly shown.

A microcomputer 11 incorporates an internal counter, a ROM 11a and a RAM 11b. The ROM 11a stores coordinates of the mark 8a. The RAM 11b stores a correction value used for vibration transmission time correction to be described later, i.e., a transmission time of an input vibration from the mark 8a of the vibration transmission plate 8 to each vibration sensor 6.

A drive signal generator 12 outputs a drive pulse of a predetermined frequency to the vibrator driver circuit 2 shown in FIG. 1 and is activated in synchronism with a circuit for coordinate calculation by the microcomputer 11.

The count of a counter 13 is latched by a latch circuit 14 under the control of the microcomputer 11.

The waveform detector 9 outputs timing information of a detection signal for measuring a vibration transmission time from the output from the vibration sensor 6 as will be described later. Each timing information is supplied to an input port 15.

Each timing signal supplied from the waveform detector 9 is supplied to the input port 15 and stored in a storage area in the latch circuit 14 corresponding to each vibration sensor 6, and the result is sent to the microcomputer 11.

That is, the vibration transmission time is represented by a latch value of output data from the counter 13, and a coordinate calculation is performed by using this vibration transmission time value. At this time, a decision circuit 16 checks whether the waveform detection timing information are supplied from all of a plurality of the vibration sensors 6 and supplies a decision result to the microcomputer 11.

Output control processing of the display 11' is performed via an input/output port 17.

Figure 4:
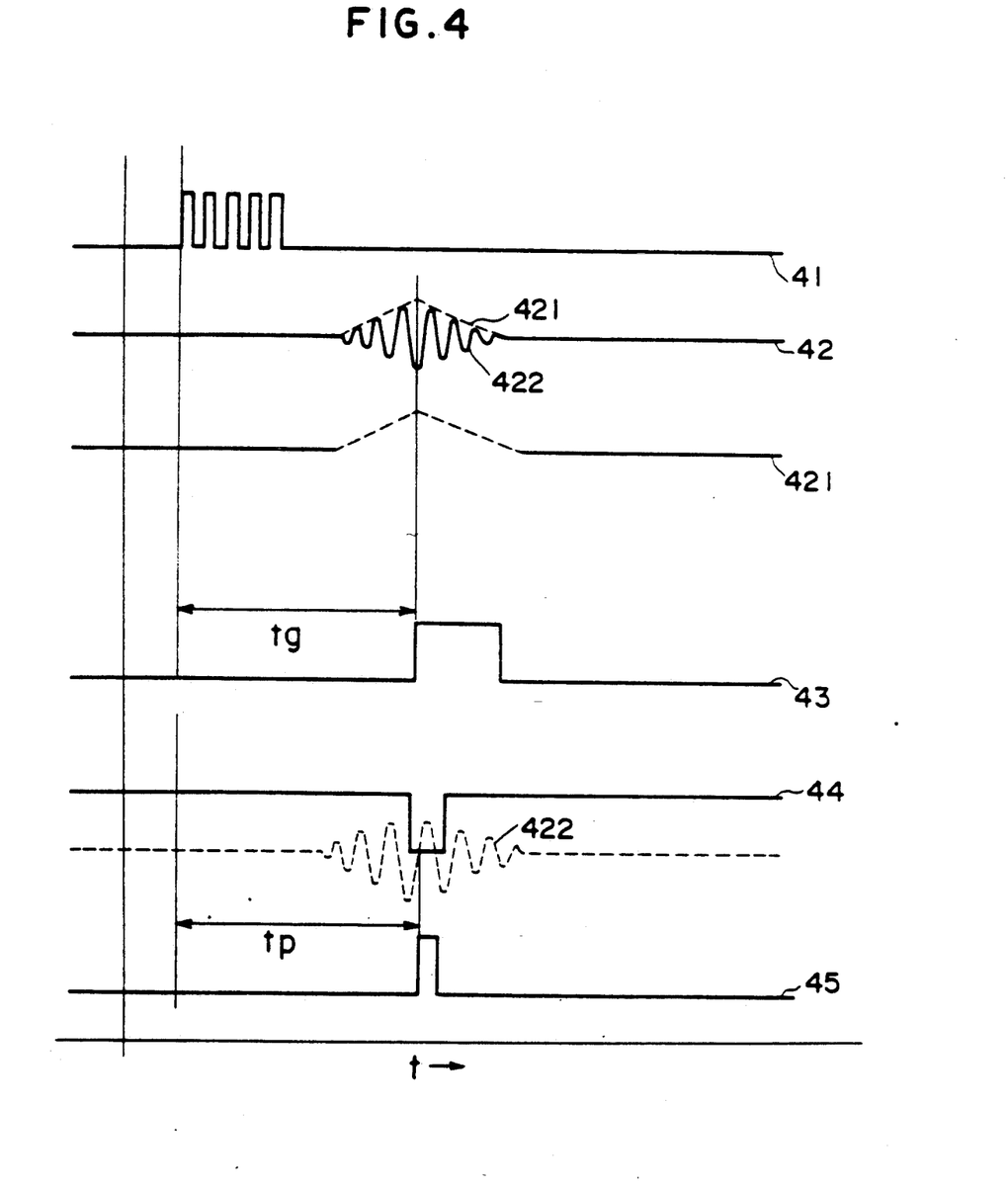
FIG. 4 timing chart showing detection waveforms for explaining distance measurement between the vibration pen and a vibration sensor.

FIG. 4 is a timing chart showing detection waveforms supplied to the waveform detector 9 shown in FIG. 1 and for explaining vibration transmission time measurement processing based on the waveforms. Referring to FIG. 4, a drive signal pulse 41 is applied to the vibration pen 3. An ultrasonic vibration transmitted from the vibration pen 3 driven by such a waveform to the vibration transmission plate 8 is detected by each vibration sensor 6 via the vibration transmission plate 8.

The vibration propagates in the vibration transmission plate 8 over the time tg corresponding to the distance to the vibration sensor 6 and reaches the vibration sensor 6. The vibration sensor 6 detects a signal waveform 42 shown in FIG. 4. Since the plate wave used in this embodiment is a dispersive wave, a relationship between an envelope 421 and a phase 422 of the detection waveform changes in accordance with the vibration transmission distance Assume that a speed of the envelope is a group speed Vg and a phase speed is Vp. The distance between the vibration pen 3 and the vibration sensor 6 can be detected from a difference between the group speed and the phase speed.

For example, since the speed of the envelope 421 is Vg, if a certain specific point on the waveform, e.g., a peak is detected as represented by reference numeral 43 in FIG. 4, a distance d between the vibration pen 3 and the vibration sensor 6 is given by the following equation assuming that a vibration transmission time is tg:

$$d = Vg \cdot tg \quad (1)$$

Although this equation is for one of the vibration sensors 6, distances between the other two vibration sensors 6 and the vibration pen 3 can be represented by the same equation.

In order to determine a coordinate with higher precision, processing based on detection of the phase signal is performed. Assuming that a time interval from vibration application to a specific detection point of a phase waveform 422 shown in FIG. 4, e.g., a zero-crossing point after the peak is tp, a distance between the vibration sensor and the vibration pen is given by the following equation:

$$d = n \cdot \lambda p + Vp \cdot tp \quad (2)$$

where λp is the wavelength of the elastic wave and n is an integer.

From equations (1) and (2), the above integer n is given by:

$$n = [(Vg \cdot tg - Vp \cdot tp)/\lambda p + 1/N] \quad (3)$$

where N is an arbitrary real number except for 0. For example, if N=2, n can be determined within the range of ±½ wavelength.

By substituting n calculated as described above into equation (2), the distance between the vibration pen 3 and the vibration sensor 6 can be correctly measured.

Figure 5:
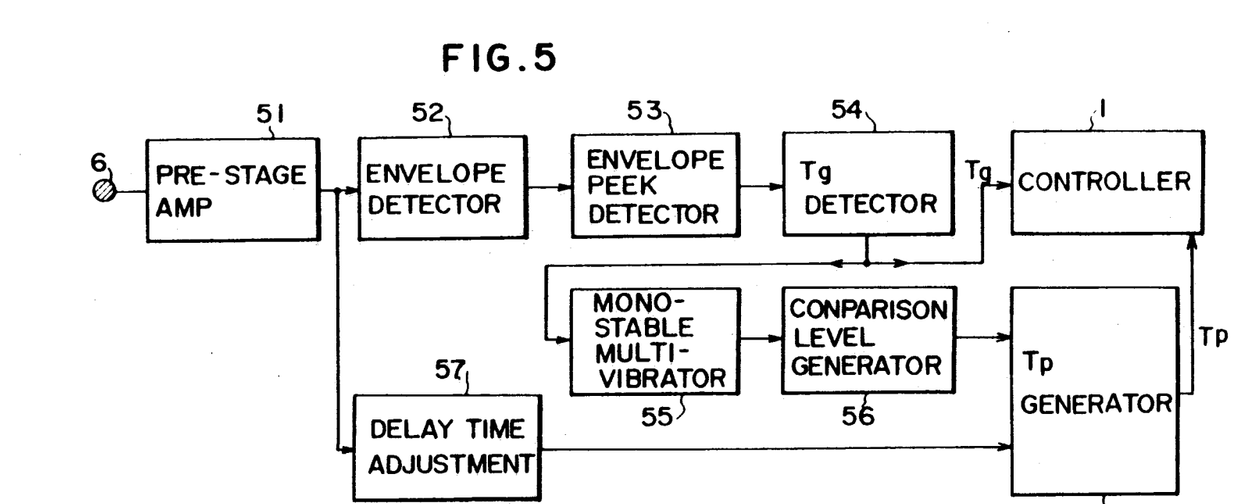
FIG. 5 is a block diagram showing an arrangement of a waveform detector shown in FIG. 1.

In order to measure the two vibration transmission times tg and tp shown in FIG. 4, the waveform detector 9 can be arranged as shown in FIG. 5.

Referring to FIG. 5, an output signal form the vibration sensor 6 is amplified to be a predetermined level by an amplifier 51 as described above.

The amplified signal is supplied to an envelope detector 52, and only an envelope of the detection signal is extracted. A peak timing of the extracted envelope is detected by an envelope peak detector 53. An envelope delay time detection signal Tg having a predetermined waveform is formed from the peak detection signal by a signal detector 54 constituted by a mono-stable multi-vibrator and supplied to the controller 1.

A Tp generator 58 generates a phase delay time detection signal Tp from the timing of the signal Tg and the original signal delayed by a delay time adjuster 57 and supplies the signal Tp to the controller 1.

That is, the signal Tg is converted into a pulse having a predetermined width by a mono-stable multi-vibrator 55. A comparison level generator 56 generates a threshold value for detecting the signal tp in accordance with the pulse timing. As a result, the comparison level generator 56 generates a signal 44 having a level and a timing as shown in FIG. 3, and supplies it to the Tp generator 58.

That is, the mono-stable multi-vibrator 55 and the comparison level generator 56 operate such that measurement of the phase delay time is performed for only a predetermined time interval after envelope peak detection.

This signal is supplied to the Tp generator 58 constituted by a comparator and compared with the detection waveform delayed as shown in FIG. 4. As a result, a tp detection pulse 45 is formed.

The above circuit is for one of the vibration sensors 6, and the same circuits are provided for other two sensors. Assuming that the number of sensors is h, h detection signals representing envelope delay times Tg1 to Tgh, and those representing phase delay times Tp1 to Tph are supplied to the controller 1.

The controller shown in FIG. 3 receives the signals Tg1 to Tgh and Tp1 to Tph from the input port 15, and fetches the count of the counter 13 to the latch circuit 14 by using the respecting timings as a trigger. Since the counter 13 is started in synchronism with driving of the vibration pen 3, data representing delay times of both the envelope and phase is fetched in the latch circuit 14.

Figure 6:
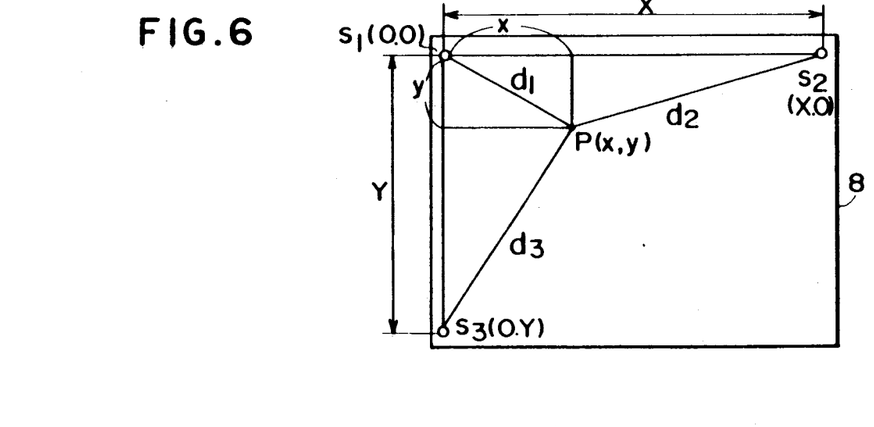
FIG. 6 is a plan view showing an arrangement of vibration sensors.

When the three vibration sensors 6 are arranged at three positions S1 to S3 at corner portions of the vibration transmission plate 8 as shown in FIG. 6, straight distances d1 to d3 from a position P of the vibration pen 3 to the respective sensors 6 can be obtained by the processing described above with reference to FIG. 4. On the basis of the straight distances d1 to d3, the controller 1 calculates coordinates (x,y) of the position P of the vibration pen 3 from the Pythagorean theorem as follows:

$$x = X/2 + (d1 + d2)(d1 - d2)/2X \quad (4)$$

$$y = Y/2 + (d1 + d3)(d1 - d3)/2Y \quad (4)$$

where X and Y are the distances from the vibration sensor 6 at the origin (position S1) to the vibration sensors 6 at the positions S2 and S3 along the X and Y axes, respectively In this manner, the coordinates of the vibration pen 3 can be detected real-time.

Correction processing for eliminating an influence of the circuit delay time et and the phase offset time tof in the calculations of determining the pen-to-sensor distance and the coordinates performed by the above arrangement will be described below.

The vibration transmission time latched by the latch circuit 14 includes the circuit delay time et and the phase offset time tof. A constant amount of error is induced due to these times upon vibration transmission from the vibration pen 3 to the vibration transmission plate 8 and the vibration sensors 6.

Therefore, assuming that a distance from the mark 8a shown in FIG. 1 to one of the vibration sensors 6 is R, measured vibration transmission times from the mark 8a to the sensor are tg'r and tp'r, and real transmission times from the mark 8a to the sensor are tgr and tpr, the following relations are satisfied for the circuit delay time et and the phase offset tof:

$$tg'r = tgr + et \quad (6)$$

$$tp'r = tgr + et + tof \quad (7)$$

Similarly, measurement values tg'p and tp'p at an arbitrary input point P are given as follows:

$$tp'p = tgp + et \quad (8)$$

$$tp'p = tpp + et + tof \quad (9)$$

Differences of the above equations are given as follows:

$$tg'p - tg'r = (tgp + et) - (tgr + et) \quad (10)$$
$$= tgp - tgr$$

$$tp'p - tp'r = (tpp + et + tof) - (tpr + et + tof) \quad (11)$$
$$= tpp - tpr$$

As a result, since the circuit delay time et and the phase offset tof included in each transmission time are removed, a real difference between the vibration transmission times corresponding to a distance between the mark 8a and the input point P with respect to the sensor position as a start point can be obtained A distance difference between the two points can be calculated from the time difference value using equations (2) and (3). The distance R from the mark 8a to each sensor is stored in the ROM 11a beforehand. Therefore, by adding these values, a distance between the input point and the sensor can be determined. A coordinate point can be calculated by performing equations (4) and (5).

The correction values tg'r and tp'r may be obtained by inputting a vibration to the mark 8a at a predetermined timing by, e.g., displaying information for an operator on the display 11' immediately after a power source is switched on. Alternatively the correction values may be obtained upon each predetermined time period during the operation. The obtained correction values may be stored in the RAM 11b.

By performing the above correction upon each operation, a change in circuit delay time or the like caused by an influence of an environmental variation can be properly corrected.

In addition, the correction values may be fetched in advance and data of the correction values may be stored in, e.g., a nonvolatile memory. In this case, a circuit delay and a phase offset having variations of individual apparatuses can be properly corrected.

In the above embodiment, the delay time at the known mark 8a must be measured, and an operator must correctly perform coordinate input at the mark 8a. By using the following method, however, coordinate input for correction value input can be performed at an arbitrary position.

That is, coordinates are determined by hyperbolic functions by using a delay time difference between sensors, and delay time correction is performed on the basis of the coordinate values.

Coordinates are determined by the delay time difference as follows That is, the sensors are straight lines connecting opposing sensors is considered as the origin 0. In this case, assuming that a difference between distances from the origin 0 to sensors S0 and S1 is a and that between distances from the origin 0 to sensors S2 and S3 is b, a designated position P(x,y) can be calculated as follows as an intersection of hyperbolic functions:

$$x = \frac{1}{2} a \sqrt{\frac{(c^2 + b^2) \cdot d^2}{c^2 d^2 - a^2 b^2}} \quad (12)$$

$$y = \frac{1}{2} b \sqrt{\frac{(d^2 + a^2) \cdot c^2}{c^2 d^2 - a^2 b^2}} \quad (13)$$

for $c^2 = 4X^2 - a^2$, $d^2 = 4Y^2 - b^2$, and $c^2 d^2 - a^2 b^2 > 0$. Coordinates of an arbitrary input point can be determined by these equations. At this time, if the vibration transmission times to the respective sensors are stored as correction values in the RAM 11b, the above correction processing can be performed.

According to the above method, since correction values at an arbitrary point can be obtained, even a user can easily perform correction. In addition, by performing this operation periodically at a predetermined time interval or irregularly (e.g., when a certain arbitrary area is designated during coordinate input), correction values can be automatically fetched without an operation of a user. Also, a circuit delay time change caused by a temperature change or the like can be completely corrected.

As is apparent from equations (12) and (13), however, calculations using the microprocessor become very complex. Therefore, in terms of precision and a calculation speed, the former method is more advantageous for realtime coordinate determination.

When correction values are fetched as in the above embodiment, a time is not much limited, and the number of digits of calculations can be increased. Therefore, the present invention can be applied to coordinate determination.

Figure 7:
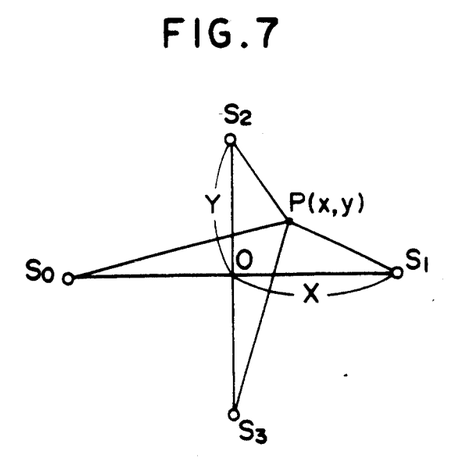
FIG. 7 is a view showing a sensor arrangement according to another embodiment.

Even when the sensors are arranged as shown in FIG. 7, coordinates can be similarly determined by the Pythagorean theorem as described above.

In the above embodiment, the coordinate input apparatus mainly using a plate wave has been described. However, an arrangement of the present invention is not limited to the above embodiment but can be applied to a variety of coordinate input apparatuses based on vibration transmission.

What is claimed is:
1. A coordinate input apparatus comprising:
a vibration pen including vibration generating means for generating a vibration;
a vibration transmission plate for transmitting the vibration generated by said vibration pen;
a plurality of vibration detecting means for detecting the vibration transmitted by said vibration transmission plate;
calculating means for calculating vibration transmission times from a point designated by said vibration pen to said plurality of vibration detecting means, and calculating coordinate values of the designated point designated by said vibration pen;
memory means for storing the vibration transmission times from a first designated point of said vibration pen on said vibration transmission plate to said plurality of vibration detecting means and coordinate values of the first designated point; and
control means for performing calculations on the basis of vibration transmission times from a second designated point calculated by said calculating means to said plurality of vibration detecting means, the vibration transmission times from the first designated point and the coordinates values of the first designated point stored in said memory means, thereby calculating coordinate values of the second designated point,
wherein said control means subtracts the vibration transmission times stored in said memory means from the vibration transmission times from the second designated point to said pluraltiy of vibration detecting means to calculate a vibration transmission time differ- ence between the first and second designated points, and calculates the coordinate values of the second designated point on the basis of the vibration transmission time difference and the coordinate values of the first designated point.

2. An apparatus according to claim 1, wherein said vibration transmission plate comprises a transparent member, and said apparatus further comprises display means for displaying information under said vibration transmission plate.

3. An apparatus according to claim 1, wherein said vibration transmission plate comprises an acryl plate.

4. An apparatus according to claim 1, wherein said vibration transmission plate comprises a glass plate.

5. An apparatus according to claim 1, wherein said calculating means calculates vibration transmission times and coordinate values of the first designated point upon each predetermined time period.

6. An apparatus according to claim 1, wherein said calculating means calculates a vibration transmission time on the basis of a group speed and a phase speed of the vibration transmitted by said vibration transmission plate.

7. A coordinate input apparatus comprising:
a vibration pen including vibration generating means for generating a vibration;
a vibration transmission plate for transmitting the vibration generated by said vibration pen;
a plurality of vibration detecting means for detecting the vibration transmitted by said vibration transmission plate;
memory means for storing vibration transmission times from a predetermined point on said vibration transmission plate to said plurality of vibration detecting means and coordinate values of the predetermined point; and
control means for calculating a plurality of vibration transmission times from a designated point of said vibration pen to said plurality of vibration detecting means, and performing calculations on the basis of the plurality of vibration transmission times, and the vibration transmission times and the coordinate values of the predetermined point stored in said memory means, thereby calculating coordinate values of the designated point,
wherein said control means subtracts the plurality of vibration transmission times stored in said memory means from the vibration transmission times from the designated point to said plurality of vibration detecting means to calculate a vibration transmission time difference between the predetermined point and the designated point, and calculates the coordinate values of the designated point on the basis of the vibration transmission time difference and the coordinate values of the predetermined point.

8. An apparatus according to claim 7, wherein said vibration transmission plate comprises a transparent member, display means for displaying information being located under said vibration transmission plate.

9. An apparatus according to claim 7, wherein said vibration transmission plate comprises an acryl plate.

10. An apparatus according to claim 7, wherein said vibration transmission plate comprises a glass plate.

11. An apparatus according to claim 7, wherein said calculating means calculates a vibration transmission time on the basis of a group speed and a phase speed of the vibration transmitted by said vibration transmission plate.

12. A coordinate input apparatus comprising:
a vibration pen including vibration generating means for generating a vibration;
a vibration transmission plate for transmitting the vibration generated by said vibration pen;
a plurality of vibration detecting means for detecting the vibration transmitted by said vibration transmission plate;
calculating means for calculating a plurality of vibration transmission times from a point designated point by said vibration pen to said plurality of vibration detecting means, and calculating coordinate vlues of the designated point on the basis of the plurality of vibration transmission times;
memory means for storing, when a predetermined point is designated by said vibration pen, a plurality of vibration transmission times from the predetermined point to said plurality of vibration detecting means and coordinate values of the predetermined point calculated by the calculating means; and
control means for causing, after the predetermined point is designated by said vibration pen, said calculating means to calculate vibration transmission times from a designated point of said vibration pen to said plurality of vibration detecting means, and performing calculations on the basis of the calculated vibration transmission times, and the vibration transmission times from the predetermined point to said plurality of vibration detecting means and the coordinate values of the predetermined point stored in said memory means, thereby calculating coordinate values of the designated point,
wherein said control means subtracts the vibration transmission times from the predetermined point stored in said memory means from the vibration transmission times from the designated point to said plurality of vibration detecting means to calculate a vibration transmission time difference between the predetermined point and the designated point, and calculates the coordinate values of the designated point on the basis of the vibration transmission time difference and the coordinate values of the predetermined point.

13. An apparatus according ot claim 12, wherein said vibration transmission plate comprises a transparent member, display means for displaying information being located under said vibration transmission plate.

14. An apparatus according to claim 13, wherein said display means displays a pattern indicating a position of the predetermined point.

15. An apparatus according to claim 12, wherein said vibration transmission plate comprises an acryl plate.

16. An apparatus according to claim 12, wherein said vibration transmission plate comprises a glass plate.

17. An apparatus according to claim 12, wherein said calculating means calculates a vibration transmission time on the basis of a group speed and a phase speed of the vibration transmitted by said vibration transmission plate.

* * * * *

UNITED STATES PATENT AND TRADEMARK OFFICE
CERTIFICATE OF CORRECTION

PATENT NO. : 5,070,325

DATED : December 3, 1991

INVENTOR(S) : ATSUSHI TANAKA ET AL.

It is certified that error appears in the above-identified patent and that said Letters Patent is hereby corrected as shown below:

IN THE DRAWINGS, SHEET 4 OF 5

FIG. 5, "PEEK" should read --PEAK-- and
         "CONPARISON" should read --COMPARISON--.

COLUMN 1

23, "plate Correct" should read --plate.  Correct--.
    47, "offset" should read --offset,--.

COLUMN 2

Line 8, "an" should read --It is an-- and
        close up right margin.
    Line 9, "It is" should be deleted.
    Line 27, "FIG. 4" should read --FIG. 4 is a--.
    Line 57, "pen 3to" should read --pen 3 to--.

COLUMN 3

Line 49, "efficiency" should read --efficiently--.

COLUMN 5

Line 40, "form" should read --from--.

UNITED STATES PATENT AND TRADEMARK OFFICE
CERTIFICATE OF CORRECTION

PATENT NO. : 5,070,325

DATED : December 3, 1991

INVENTOR(S) : ATSUSHI TANAKA ET AL.

It is certified that error appears in the above-identified patent and that said Letters Patent is hereby corrected as shown below:

COLUMN 6

Line 14, "respecting" should read --respective--.
Line 30, "x=X/2+(d1+d2)d1-d2)/2X        (4)" should read
--x=X/2+(d1+d2)(d1-d2)/2X        (4)--.
Line 32, "y=Y/2+(d1+d3)d1-d3)/2Y        (4)" should read
--y=Y/2+(d1+d3)(d1-d3)/2Y        (4)--.
Line 38, "detected" should read --detected in--.

COLUMN 7

Line 51, after "as follows" insert a --.--.
Line 51, "are straight" should read --are arranged as shown in FIG. 7, and an intersection of straight--.

COLUMN 8

Line 60, "coordinates" should read --coordinate--.

UNITED STATES PATENT AND TRADEMARK OFFICE
CERTIFICATE OF CORRECTION

PATENT NO. : 5,070,325

DATED : December 3, 1991

INVENTOR(S) : ATSUSHI TANAKA ET AL.

It is certified that error appears in the above-identified patent and that said Letters Patent is hereby corrected as shown below:

<u>COLUMN 10</u>

```
Line 15, "point" should be deleted.
Line 18, "vlues" should read --values--.
Line 48, "ot" should read --to--.
```

Signed and Sealed this

Twenty-eighth Day of September, 1993

Attest:

BRUCE LEHMAN

*Attesting Officer*      *Commissioner of Patents and Trademarks*